US 11,757,548 B2

(12) United States Patent
Ohtsuji et al.

(10) Patent No.: US 11,757,548 B2
(45) Date of Patent: Sep. 12, 2023

(54) TRANSMISSION APPARATUS RECOGNITION APPARATUS, TRANSMISSION APPARATUS RECOGNITION METHOD, AND NON-TRANSITORY COMPUTER READABLE MEDIUM

(71) Applicant: NEC Corporation, Tokyo (JP)

(72) Inventors: Taichi Ohtsuji, Tokyo (JP); Jun Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 17/316,844

(22) Filed: May 11, 2021

(65) Prior Publication Data

US 2021/0359775 A1 Nov. 18, 2021

(30) Foreign Application Priority Data

May 13, 2020 (JP) ................................. 2020-084332

(51) Int. Cl.
*H04B 17/391* (2015.01)
*H04W 16/18* (2009.01)

(52) U.S. Cl.
CPC .......... *H04B 17/391* (2015.01); *H04W 16/18* (2013.01)

(58) Field of Classification Search
CPC .............................. H04B 17/391; H04W 16/18
See application file for complete search history.

(56) References Cited

FOREIGN PATENT DOCUMENTS

| JP | 2016158209 A | 9/2016 |
| JP | 2018011241 A | 1/2018 |
| JP | 6354104 B2 | 7/2018 |
| JP | 6509465 B2 | 5/2019 |

OTHER PUBLICATIONS

S. U. Rehman et al., "Analysis of Receiver Front End on the Performance of RF Fingerprinting", 2012 IEEE 23rd International Symposium on Personal, Indoor and Mobile Radio Communications—(PIMRC), 2012, pp. 2494-2499.

*Primary Examiner* — Natasha W Cosme
(74) *Attorney, Agent, or Firm* — Sughrue Mion, PLLC

(57) ABSTRACT

A transmission apparatus recognition apparatus includes a receiver configured to receives a signal wirelessly transmitted from a transmission apparatus, a signal region detector, a feature extractor, and a recognizer. The signal region detector generates a spectrogram from a received signal received by the receiver, and detects a signal region parameter indicating a specific signal region based on the spectrogram. The feature extractor converts the received signal based on a signal conversion parameter according to the signal region parameter, and extracts a feature from the converted signal. The recognizer calculates a degree of similarity based on the extracted feature and a feature stored in advance, and recognizes the transmission apparatus based on the degree of similarity. The transmission apparatus recognition apparatus adjusts the signal region parameter based on a recognition accuracy of the recognizer.

9 Claims, 11 Drawing Sheets

TRANSMISSION APPARATUS RECOGNITION APPARATUS, TRANSMISSION APPARATUS RECOGNITION METHOD, AND NON-TRANSITORY COMPUTER READABLE MEDIUM

INCORPORATION BY REFERENCE

This application is based upon and claims the benefit of priority from Japanese patent application No. 2020-084332, filed on May 13, 2020, the disclosure of which is incorporated herein in its entirety by reference.

TECHNICAL FIELD

The present disclosure relates to a transmission apparatus recognition apparatus, a transmission apparatus recognition method, and a non-transitory computer readable medium.

BACKGROUND ART

Techniques for determining a wireless terminal apparatus (hereinafter, simply referred to as a wireless terminal) such as a mobile terminal apparatus have been proposed.

For example, S. U. Rehman, K. Sowerby, and C. Coghill, "Analysis of Receiver Front End on the Performance of RF Fingerprinting," 2012 IEEE International Symposium on Personal, Indoor, and Mobile Radio Communications (PIMRC), pp. 2494-2499, 2012 describes a radio wave identification system in which a receiver determines (identifies) a wireless terminal based on the characteristics of a signal received from the wireless terminal. This radio wave identification system converts the waveform of a known signal such as a preamble signal into a power spectral density. After that, the radio wave identification system learns using the power spectral density as a feature using a machine learning algorithm such as the k-nearest neighbor algorithm, and generates an identification model. After that, the radio wave identification system inputs the feature extracted from a received signal into the trained model to identify which terminal transmits among the trained wireless terminals.

Generally, the feature is thus extracted from the signal received to identify the wireless terminal. In order to increase the identification accuracy, it is necessary to accurately extract the target signal from the received signals. Standardized communication systems such as wireless LAN (Local Area Network) and LTE (Long Term Evolution) each have a predetermined center frequency and bandwidth of signals. However, other signals emit, and they include signals of communication systems such as the ISM (Industry Science and Medical) band, which can be used without a license and whose frequencies and bandwidths are not standardized, and signals emitted by microwave ovens and other high-frequency devices. In order to extract a target signal in an environment in which there are a plurality of radio signal transmission sources having different systems, there are known techniques of detecting a time-frequency domain of the target signal from a generated spectrogram.

For example, the technique described in Japanese Patent No. 6354104 determines the time-frequency domain where, in the spectrogram of the received signal, the points where the rising and falling edges in the time direction are continuous in the frequency direction are defined as the transmission start time and the transmission end time, respectively, to be the region where there are the detection target signals.

The technique described in Japanese Patent No. 6509465 first uses a spectrogram to generate a cumulative distribution function of received power values on the time-frequency space, and then binarizes the spectrogram with a power threshold value that corresponds to a predetermined probability threshold value. Then, in this technique, the time-frequency region defined by the circumscribed rectangle of the binarized spectrogram is determined to be the region where there is the detection target.

Japanese Unexamined Patent Application Publication No. 2018-011241 describes an identification apparatus that identifies a model of a radio wave source even when the rising or falling edge of the radio wave source cannot be detected. The identification apparatus described in Japanese Unexamined Patent Application Publication No. 2018-011241 includes a feature extraction unit, a model-specific feature storage unit, and a model identification unit. The feature extraction unit extracts a plurality of features of the signal to be inspected, which is detected from the discretized received signal generated from the radio wave received by the antenna, including at least one feature during communication. The model-specific feature storage unit stores a model-specific feature range, which is the range that can be taken by each of the plurality of features of the received signal obtained by receiving the radio wave transmitted by the radio wave source of a certain model, for each model of the radio wave source. The model identification unit compares the feature to be inspected, which is the feature extracted from the signal to be inspected, with the model-specific feature range stored in the model-specific feature storage unit, to identify a model in which each of the plurality of features to be inspected falls within the model-specific feature range, as the model of the radio wave source that transmits the signal to be inspected.

Japanese Unexamined Patent Application Publication No. 2016-158209 describes a reception analysis apparatus whose object is analyzing the high frequency signal received from a transmission apparatus to automatically (partially manually) individually identify (identify the difference among the same type of apparatuses), classify and determine the transmission apparatus. The reception analysis apparatus described in Japanese Unexamined Patent Application Publication No. 2016-158209 divides a high frequency signal transmitted from the transmission apparatus into a wide band and a narrow band to receive it, and divides the state of the high frequency signal in the time domain into five states: a rising state, a steady state, a silent state, a falling state, and an abnormal state. Then, the reception analysis apparatus separates the modulated high frequency signal into a carrier wave and a modulated wave, converts them into a time axis and a frequency axis (including a phase change) as necessary, and parameterizes the result. Furthermore, the reception analysis apparatus uses the combination as an input and combines machine learning methods, to automatically individually identify, classify, and determine the transmission apparatus, including the characteristics, fluctuation width, and fluctuation speed of the above-mentioned parameters from the received signal.

SUMMARY

The present inventors have considered a case of receiving a signal of a non-standardized communication system to recognize a transmission apparatus (wireless terminal). In this case, since the parameters such as the center frequency and the bandwidth, in other words, the transmission patterns are unknown, it is necessary to receive the signal in a wider band than the target signal and extract the region where there is the detection target signal. However, when the system user (operator, worker in charge) manually determines the above parameters, the determination differs depending on the proficiency and individual differences.

Therefore, when there is a difference in the above parameters between when the feature is registered in the database and when it is recognized, there is a problem that a difference is generated in the extracted features, and as a result, identification accuracy (recognition accuracy) decreases. In addition, even when a plurality of transmission signals are included in the received signal, it can be said that a difference is generated in the extracted features, so that such a decrease in recognition accuracy can be generated as well.

In the technique described in "Analysis of Receiver Front End on the Performance of RF Fingerprinting," the wireless system of the transmission terminal to be identified (recognized) is wireless LAN, and the above-mentioned problem cannot be solved in the case of receiving a signal of a communication system that is not standardized. Note that Japanese Patent No. 6354104 and Japanese Patent No. 6509465 do not disclose a method for determining the center frequency and bandwidth in consideration of determination (identification) of the transmission terminal.

In addition, although the technique described in Japanese Unexamined Patent Application Publication No. 2018-011241 can solve the problem that the transmission terminal cannot be identified when the rising or falling timing thereof cannot be received, but it cannot solve the deviation of the center frequency and the bandwidth.

In addition, the technique described in Japanese Unexamined Patent Application Publication No. 2016-158209 cannot solve the above-mentioned problems when there is a difference in bandwidth. Therefore, it can be said that the above problem cannot be solved when there is a difference in the parameters indicating the signal region. In addition, the technique described in Japanese Unexamined Patent Application Publication No. 2016-158209 cannot solve the above-mentioned problems when a plurality of signal waves (signal waves having different center frequencies) are included in the received signal in a wide band.

In view of the above problems, it is an object of the present disclosure to provide a transmission apparatus recognition apparatus, a transmission apparatus recognition method, and a non-transitory computer readable medium including a program recorded therein. That is, the object of the present disclosure is to provide a transmission apparatus recognition apparatus, a transmission apparatus recognition method, and a non-transitory computer readable medium including a program recorded therein, capable of reducing a decrease in recognition accuracy even for a wider band signal compared to the signal wirelessly transmitted from a transmitting apparatus to be recognized.

The transmission apparatus recognition apparatus according to a first aspect of the present disclosure includes: a receiving unit (receiver) configured to receive a signal wirelessly transmitted from a transmission apparatus; a signal region detection unit (signal region detector) configured to generate a spectrogram from a received signal received by the receiving unit and to detect a signal region parameter indicating a specific signal region based on the spectrogram; a feature extraction unit (feature extractor) configured to convert the received signal based on a signal conversion parameter corresponding to the signal region parameter and to extract a feature from a converted signal; and a recognition unit (recognizer) configured to calculate a degree of similarity based on a feature extracted by the feature extraction unit and a feature stored in advance and to recognize the transmission apparatus based on the degree of similarity, wherein the signal region parameter detected by the signal region detection unit is adjusted based on a recognition accuracy that is a recognition accuracy of the recognition unit.

The transmission apparatus recognition method according to a second aspect of the present disclosure is a transmission apparatus recognition method in a transmission apparatus recognition apparatus including a receiving unit (receiver) configured to receive a signal wirelessly transmitted from a transmission apparatus. The method includes: a signal region detection step of generating a spectrogram from a received signal received by the receiving unit and detecting a signal region parameter indicating a specific signal region based on the spectrogram; a feature extraction step of converting the received signal based on a signal conversion parameter corresponding to the signal region parameter and extracting a feature from a converted signal; a recognition step of calculating a degree of similarity based on a feature extracted in the feature extraction step and a feature stored in advance and recognizing the transmission apparatus based on the degree of similarity; and an adjustment step of adjusting the signal region parameter detected in the signal region detection step based on a recognition accuracy that is a recognition accuracy in the recognition step.

In a non-transitory computer readable medium including a program recorded therein according to a third aspect of the present disclosure, the program is configured to cause a computer, which is mounted on a transmission apparatus recognition apparatus including a receiving unit (receiver) configured to receive a signal wirelessly transmitted from the transmission apparatus, to execute: a signal region detection step of generating a spectrogram from a received signal received by the receiving unit and detecting a signal region parameter indicating a specific signal region based on the spectrogram; a feature extraction step of converting the received signal based on a signal conversion parameter corresponding to the signal region parameter and extracting a feature from a converted signal; a recognition step of calculating a degree of similarity based on a feature extracted in the feature extraction step and a feature stored in advance and recognizing the transmission apparatus based on the degree of similarity; and an adjustment step of adjusting the signal region parameter detected in the signal region detection step based on a recognition accuracy that is a recognition accuracy in the recognition step.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Hereinafter, example embodiments will be described with reference to the drawings. In the present specification and drawings, elements that can be described in the same manner may be designated by the same reference signs so that duplicate description may be omitted.

<First Example Embodiment>

Figure 1:
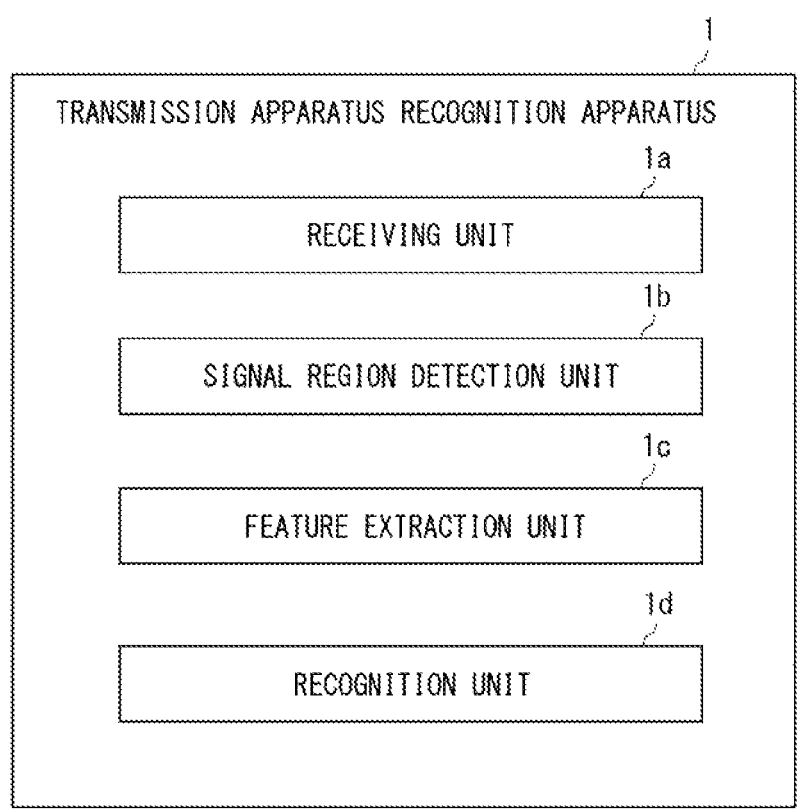
FIG. 1 is a block diagram showing a configuration example of a transmission apparatus recognition apparatus according to a first example embodiment.

A first example embodiment will be described with reference to FIG. 1. FIG. 1 is a block diagram showing a configuration example of a transmission apparatus recognition apparatus according to the first example embodiment.

As shown in FIG. 1, the transmission apparatus recognition apparatus 1 includes a receiving unit (receiver) 1a, a signal region detection unit (signal region detector) 1b, a feature extraction unit (feature extractor) 1c, and a recognition unit (recognizer) 1d. The receiving unit 1a receives a signal wirelessly transmitted from at least one transmission apparatus (not shown), and may also be referred to as a wireless receiving unit. In addition, the transmission apparatus may be not only wireless terminal apparatuses (wireless terminals) capable of wireless communication, but also apparatuses that unintentionally transmit radio waves (such as LED (light emitting diode) apparatuses that emit noise, and wireless apparatuses with failed amplifiers). Hereinafter, the transmission apparatus will be referred to as a "transmission terminal" or simply a "terminal" for explanation.

The signal region detection unit 1b detects a signal region parameter indicating a signal region (specific signal region) that can be a target signal from the received signal received by the receiving unit 1a. The specific signal region may be one region or a plurality of regions. In particular, the signal region detection unit 1b generates a spectrogram from the received signal received by the receiving unit 1a, and detects a signal region parameter indicating a specific signal region based on the generated spectrogram. The detected signal region parameter can be output to the feature extraction unit 1c. In other words, the signal region detection unit 1b can generate a spectrogram from the received signal, detect a specific signal region based on the generated spectrogram, and output a signal region parameter indicating the specific signal region.

The feature extraction unit 1c converts each of the received signals received by the receiving unit 1a based on each of one or more signal conversion parameters corresponding to each of the one or more signal region parameters detected by the signal region detection unit 1b, and extracts each feature from each of the converted signals.

The recognition unit 1d calculates a degree of similarity based on the feature extracted by the feature extraction unit 1c (hereinafter, sample feature) and the feature stored in advance (hereinafter, template feature), and recognizes the transmission terminal based on the calculated degree of similarity. Where the template feature is registered may be a storage apparatus provided as a template feature storage unit in the recognition unit 1d, but may be a storage apparatus external to the transmission apparatus recognition apparatus 1.

In addition, the recognition of the transmission terminal can be executed by comparing the calculated degree of similarity with a threshold value for recognition (recognition threshold value), and for example, a case in which the degree of similarity is equal to or higher than the recognition threshold value can be regarded as a case in which the recognition is successful. In addition, the recognition unit 1d can evaluate the accuracy of the recognition (recognition accuracy), that is, the recognition degree, and output the recognition accuracy at the time of recognition. In this way, the recognition unit 1d can perform a recognition process between the sample feature and the template feature, and can evaluate the recognition accuracy (output as an evaluation value). This recognition accuracy can be obtained as a function of the degree of similarity, for example, a value proportional to the calculated similarity, or by comparing the degree of similarity with a plurality of threshold values, to give a simple example.

As described above, the transmission apparatus recognition apparatus 1 according to this example embodiment is an apparatus that recognizes a transmission source using a signal wirelessly transmitted from a transmission terminal (radio wave received from the transmission terminal), and can also be referred to as a radio wave sensor apparatus or a recognition processing apparatus. However, as described above, an apparatus that unintentionally transmits radio waves can also be included in the transmission terminal.

Therefore, the specific signal region can be any one of (A) a signal in a standardized communication system region, (B) a signal in a non-standardized communication system region, and (C) a signal of an apparatus that unintentionally transmits radio waves. Then, which of the above (A), (B), and (C) the specific signal region corresponds to can be determined by using the result of recognition with the template feature registered (stored) in advance. In addition, the result of recognition with the template feature also makes it possible to determine: what communication system region signal in the (A) the specific signal region corresponds to; what communication system region signal in the (B) the specific signal region corresponds to; what kind of apparatus signal in the (C) the specific signal region corresponds to; and the like.

The transmission apparatus recognition apparatus 1 according to this example embodiment, as one of the main characteristics thereof, adjusts the signal region parameter detected by the signal region detection unit 1b, that is, the signal region parameter output by the signal region detection unit 1b, based on the recognition accuracy of the recognition unit 1d.

To give a simple example of adjustment based on recognition accuracy, the signal region detection unit 1b or the feature extraction unit 1c adjusts the signal region parameters output from the signal region detection unit 1b when the recognition accuracy output by the recognition unit 1d is lower than a predetermined threshold value. Basically, this adjustment is made so that the recognition accuracy is finally high.

As a result, in this example embodiment, when a signal of a non-standardized communication system is received and the transmission terminal is recognized, the signal region parameter is automatically adjusted based on the recognition accuracy, and the difference between the feature when registered for recognition and the feature to be extracted is eliminated. Note that the same applies to the case in which the apparatus (C) is recognized as a transmission terminal. As a result, according to this example embodiment, even in a situation where signal region parameters such as the center frequency and bandwidth of a signal received over a wide band is different from those when pre-registered for recognition, it is possible to reduce decrease in identification accuracy (recognition accuracy). In other words, according to this example embodiment, the recognition accuracy can be maintained by automating signal region detection and signal conversion processing even for wide band signals, regardless of the proficiency level and individual difference of the worker in charge, in other words, not depending on the adjustment of the signal region parameter made by a skilled user. Here, the wide band means a wider band than that of the signal wirelessly transmitted from the transmission terminal to be recognized.

In addition, according to this example embodiment, when a plurality of transmission signals are included in the received signal, it is possible to reduce the decrease in recognition accuracy in the same manner.

Thus, according to this example embodiment, in recognition of the transmission terminal, it is possible to reduce decrease in recognition accuracy even for a wide band signal as compared with a signal wirelessly transmitted from a transmission terminal to be recognized.

<Second Example Embodiment>

Figure 2:
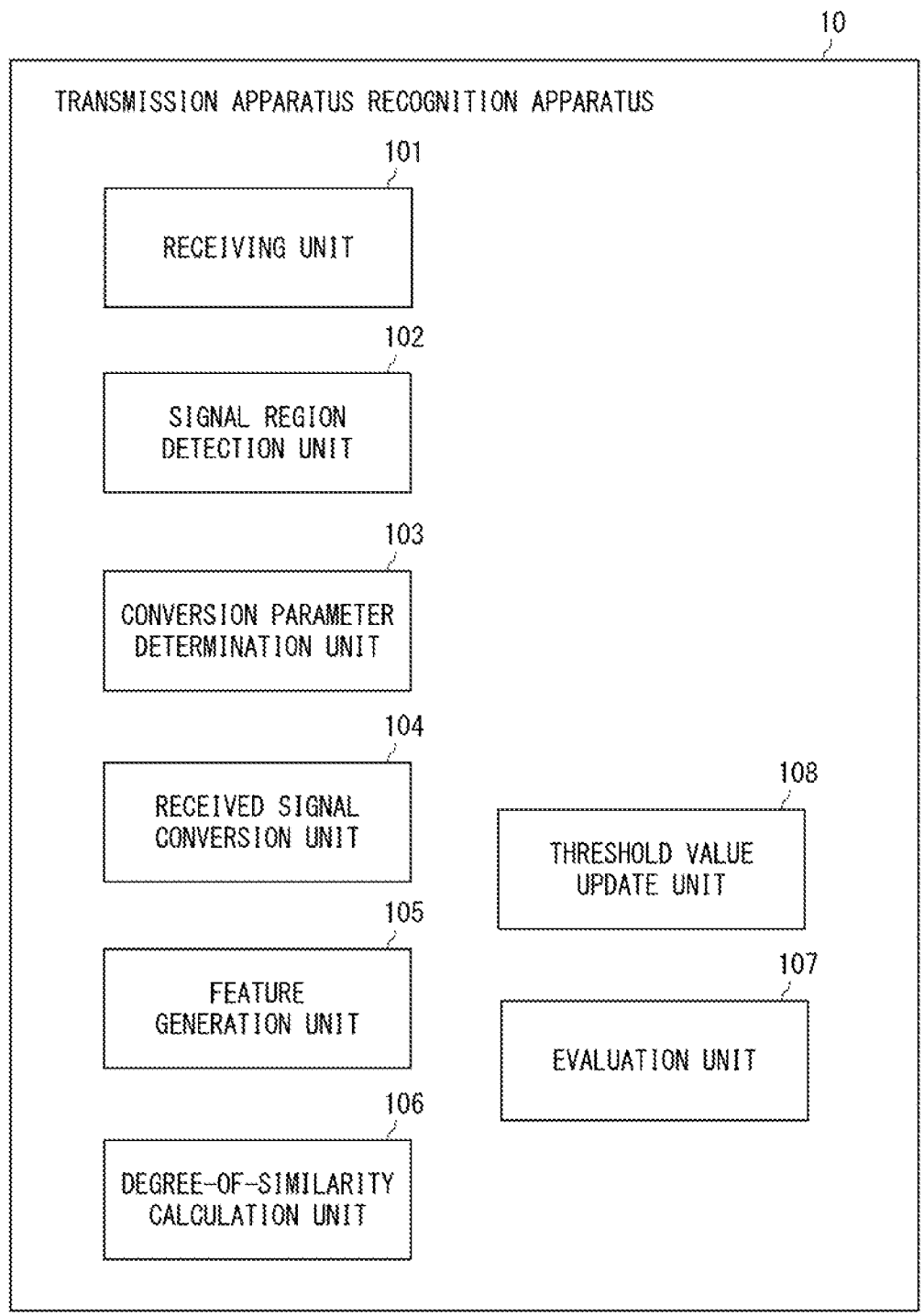
FIG. 2 is a block diagram for explaining an outline of a transmission apparatus recognition apparatus according to a second example embodiment.

A second example embodiment will be described focusing on differences from the first example embodiment with reference to FIGS. 2 to 10. Also, in the second example embodiment, various examples described in the first example embodiment can be applied. First, an outline of a transmission apparatus recognition apparatus according to the second example embodiment will be described with reference to FIG. 2. FIG. 2 is a block diagram for explaining the outline of the transmission apparatus recognition apparatus according to the second example embodiment. Note that the reference numerals of the drawing added to this outline are added to each element for convenience as an example for assisting understanding, and the description of this outline is not intended to limit anything.

As shown in FIG. 2, the transmission apparatus recognition apparatus 10 according to this example embodiment includes a receiving unit 101 corresponding to the receiving unit 1a of FIG. 1, and can also include the following components. That is, the transmission apparatus recognition apparatus 10 can include a signal region detection unit 102, a conversion parameter determination unit 103, a received signal conversion unit 104, a feature generation unit 105, a degree-of-similarity calculation unit 106, an evaluation unit 107, and a threshold value update unit 108. Note that the conversion parameter determination unit 103, the received signal conversion unit 104, the feature generation unit 105, and the threshold value update unit 108 correspond to an example of the feature extraction unit 1c in FIG. 1, and the degree-of-similarity calculation unit 106 and the evaluation unit 107 correspond to an example of the recognition unit 1d in FIG. 1.

The receiving unit 101 receives the signal from the transmission terminal. The signal region detection unit 102 detects a signal region parameter indicating a signal region (specific signal region) that can be a target signal from the received signal received by the receiving unit 101, and outputs the signal region parameter. Also, in this example embodiment, the specific signal region may be one or a plurality.

The conversion parameter determination unit 103 determines and outputs a signal conversion parameter so that a signal generated after converting a detection signal has a center frequency of 0 (0 Hz) and a predetermined bandwidth. The detection signal is detected among the received signals based on the signal region parameters output by the signal region detection unit 102. Here, as the signal conversion parameters, for example, the conversion frequency and the sampling rate can be determined. This determination can be made by calculation or by referring to a look-up table. If there are a plurality of signal region parameters, the conversion parameter determination unit 103 determines the signal conversion parameters for each of them. Note that the detection signal refers to a signal in a specific signal region indicated by a signal region parameter among received signals.

The received signal conversion unit 104 converts the received signal received by the receiving unit 101 based on the signal conversion parameter output by the conversion parameter determination unit 103. Here, the received signal conversion unit 104 converts the received signal in a time slot in which there is the detection signal according to the signal conversion parameter. As a result, the signal conversion can be performed only in the time slot in which there is the detection signal, and the converted signal can be passed to the feature generation unit 105 in the subsequent stage. The feature generation unit 105 extracts the sample feature by generating the feature from the converted signal by the received signal conversion unit 104.

The degree-of-similarity calculation unit 106 calculates the degree of similarity between the sample feature output by the feature generation unit 105 and the template feature stored in advance. Then, degree-of-similarity calculation unit 106 determines that the transmission terminal has a registered (that is, known) feature when the degree of similarity is equal to or greater than a predetermined recognition threshold value, or it determines that the transmission terminal has an unregistered (that is, unknown) feature when the degree of similarity is smaller than a predetermined recognition threshold value. Alternatively, the degree-of-similarity calculation unit 106 determines that the transmission terminal has a known feature when the degree of similarity is equal to or greater than a predetermined recognition threshold value, and it determines that the transmission terminal has an unknown feature when the degree of similarity is smaller than a predetermined recognition threshold value.

The evaluation unit 107 summarizes a determination result output by the degree-of-similarity calculation unit 106 under the conditions transmitted by the known transmission terminal, and evaluates whether the recognition accuracy is lower than the predetermined threshold value. When the recognition accuracy is lower than the predetermined threshold value, the received signal conversion unit 104 repeats the process of adjusting the signal region parameter based on the evaluation result in the evaluation unit 107. Note that the evaluation result here may be the result of the above determination or the recognition accuracy itself.

Then, when the change width of the recognition accuracy converges to a predetermined value or less by adjusting the signal region parameter, the threshold value update unit 108 updates the parameter (for example, a cumulative probability threshold value) used for detecting the signal region. This cumulative probability threshold value, the details of which will be described later, is an example of a threshold value used to determine (change) the power threshold value based on iterative processing. The power threshold value is a threshold value corresponding to the width of a specific signal region (signal detection width), and in the above example, is a threshold value corresponding to a predetermined bandwidth. For example, the cumulative probability threshold value is updated from a predetermined value based on the recognition accuracy, so that the signal region parameter is adjusted based on the recognition accuracy.

As a result, according to this example embodiment, when a signal of a non-standardized communication system is received and the transmission terminal is recognized, the signal region parameter is automatically adjusted, and even in the following situation, it is possible to reduce the decrease in identification accuracy (recognition accuracy). The situation refers to a situation in which parameters such as the center frequency and bandwidth of a signal received in a wide band are different from those when they are registered in the database.

Figure 3:
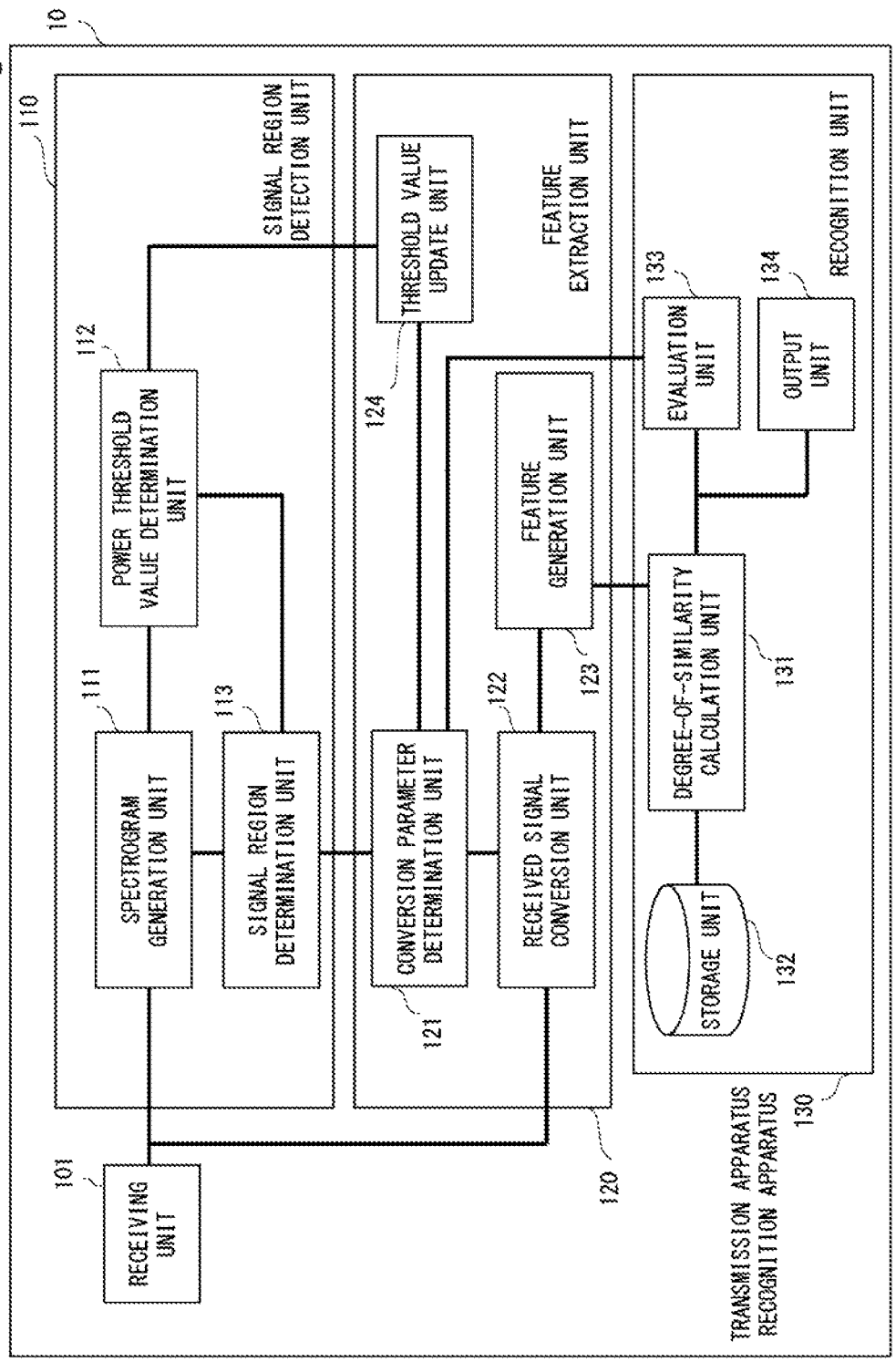
FIG. 3 is a block diagram showing an example of a functional configuration of a transmission apparatus recognition apparatus according to the second example embodiment.
Figure 4:
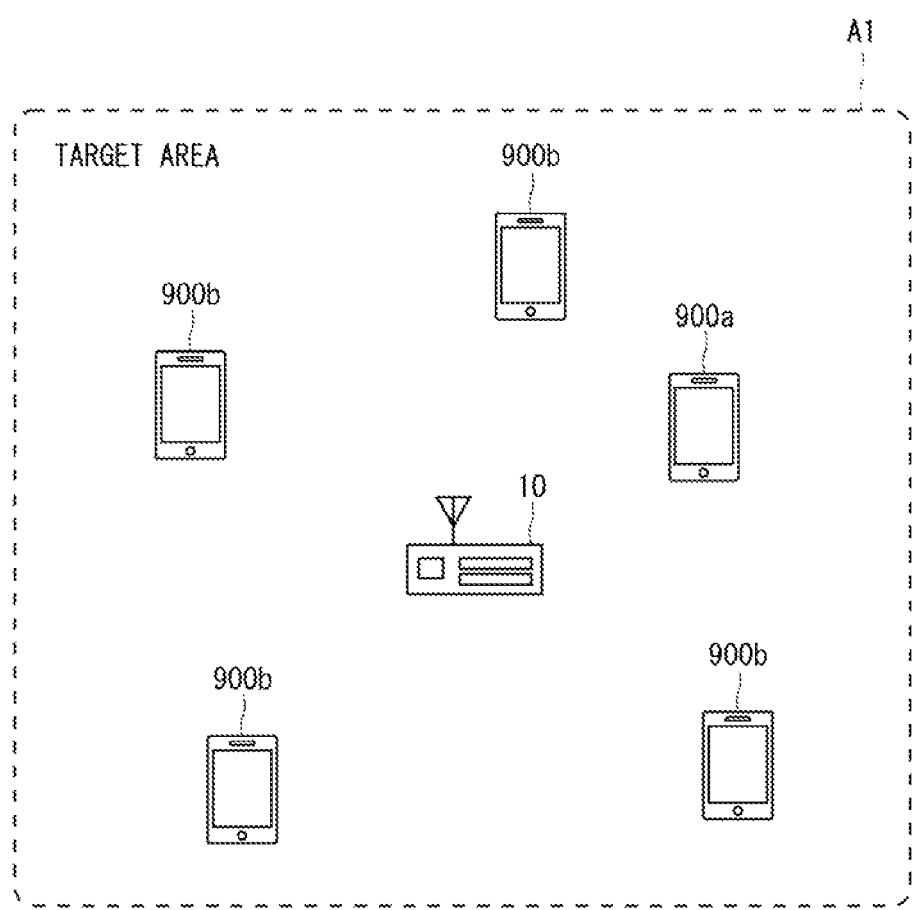
FIG. 4 is a diagram showing an arrangement example of the transmission apparatus recognition apparatus according to the second example embodiment.

Hereinafter, a more specific example of this example embodiment will be described in detail with reference to FIGS. 3 to 10. First, an example of the configuration and arrangement of the transmission apparatus recognition apparatus 10 will be described with reference to FIGS. 3 and 4. FIG. 3 is a block diagram showing an example of a functional configuration of the transmission apparatus recognition apparatus 10, and FIG. 4 is a diagram showing an arrangement example of the transmission apparatus recognition apparatus 10. Note that, of the components shown in FIG. 3, those having the same names as the components described in FIGS. 1 and 2 have basically the same functions.

The transmission apparatus recognition apparatus 10 shown in FIG. 3 calculates the degree of similarity between the sample feature generated based on the individual difference of the radio wave transmitted by the transmission terminal (not shown) and the template feature registered in advance in the internal database, to recognize the transmission terminal. Note that "recognize" can be expressed in different words such as "identify", "determine", "decide" and the like.

Here, the individual difference in radio waves and the like will be described. Individual differences may occur in the radio waves to be transmitted due to differences in the specifications of the transmission terminal, or even if the specifications are the same, due to variations in the characteristics of the analog circuit mounted on the transmission terminal. For each transmission terminal, the transmission apparatus recognition apparatus 10 registers the feature of the radio wave transmitted by the transmission terminal as a template feature in the database (storage unit 132 in FIG. 3).

Then, when the transmission apparatus recognition apparatus 10 receives the radio wave, it generates a sample feature of the received signal. The transmission apparatus recognition apparatus 10 calculates the degree of similarity between the sample feature and the template feature in the database, and determines the transmission terminal that transmits the received radio waves when there is a terminal having a template feature equal to or greater than a predetermined recognition threshold value. When there are a plurality of terminals each having a template feature equal to or greater than a predetermined recognition threshold value, the greatest one is output as a recognition result. Alternatively, a predetermined number of or less candidates may be output together with the estimated probability, where the predetermined number is 2 or more.

The recognition of the transmission terminal includes "individual identification" that determines the individual of the transmission terminal. In addition, the determination of the transmission terminal also includes "model identification" that does not determine which individual transmits the radio wave but that determines the model that transmits the radio wave. In view of this situation, in the following description, "individual identification" and "model identification" may be collectively referred to as "radio wave identification" or "terminal recognition".

The transmission apparatus recognition apparatus 10 is required to be capable of extracting the feature of the received radio wave (received radio signal), and the transmission terminal need not transmit radio waves to the transmission apparatus recognition apparatus 10 (toward the transmission apparatus recognition apparatus 10). The transmission apparatus recognition apparatus 10 can be utilized (applied) for various purposes such as detection and tracking of suspicious persons in urban areas and various facilities (airports, shopping malls, etc.), understanding the lines of flow of customers in stores and commercial facilities, and entrance/exit management to limited areas using radio waves. In addition, the transmission apparatus recognition apparatus 10 can also be utilized, for example, for searching for an interference signal transmission source for important wireless communication.

The transmission apparatus recognition apparatus 10 can determine the identity of the transmission terminal by using the feature of the radio wave. However, the transmission apparatus recognition apparatus 10 cannot directly determine the owner of the transmission terminal based on the feature. As described above, the feature of the radio wave used by the transmission apparatus recognition apparatus 10 has anonymity, and the transmission apparatus recognition apparatus 10 can perform processing in consideration of the privacy of individuals.

Hereinafter, each component of the transmission apparatus recognition apparatus 10 shown in FIG. 3 will be described.

As shown in FIG. 3, the transmission apparatus recognition apparatus 10 can include a receiving unit 101, a signal region detection unit 110, a feature extraction unit 120, and a recognition unit 130. Note that these components are examples of the receiving unit 1a, the signal region detection unit 1b, the feature extraction unit 1c, and the recognition unit 1d of FIG. 1, respectively.

The receiving unit 101 receives radio waves (radio signals) from transmission terminals including the transmission terminal that is the target of radio wave identification. Here, the number of receiving units 101 included in the transmission apparatus recognition apparatus 10 is required to be one or more. That is, the transmission apparatus recognition apparatus 10 may include at least one receiving unit 101.

Here, an arrangement example of the transmission apparatus recognition apparatus 10 including the receiving unit 101 and the transmission terminal will be described with reference to FIG. 4. In the example of FIG. 4, there are shown the transmission apparatus recognition apparatus 10 and the transmission terminals 900a and 900b arranged in a target area A1 of the terminal recognition by the transmission apparatus recognition apparatus 10. Here, the transmission terminal 900a is a transmission terminal to be recognized by the transmission apparatus recognition apparatus 10, and the transmission terminals 900b are transmission terminals not to be recognized by the transmission apparatus recognition apparatus 10. In the present disclosure, unless there is a particular reason for distinguishing between the transmission terminal 900a and the transmission terminal 900b, they are simply referred to as "transmission terminal 900". Note that, although FIG. 4 illustrates one transmission terminal 900a to be recognized, actually, a plurality of transmission terminals 900a to be recognized are included. That is, there are at least one or more transmission terminals 900a in the field (target area). In addition, FIG. 4 does not illustrate a receiving apparatus (a wireless communication base station, an access point, and the like, which will be described later) of radio wave transmitted by the transmission terminal.

Examples of the transmission terminal 900 include mobile terminal apparatuses such as mobile phones (including those called smartphones), game machines, and tablet terminals, and computers (personal computers, laptop computers). Alternatively, examples of the transmission terminal 900 may include an IoT (Internet of Things) terminal, and an MTC (Machine Type Communication) terminal that transmit radio waves. However, the transmission terminals 900 (including the target of terminal recognition by the transmission apparatus recognition apparatus 10) is not limited to the above examples. That is, in the present disclosure, any apparatus that transmits radio waves can be a target of terminal recognition by the transmission apparatus recognition apparatus 10.

As described above, the radio wave transmitted by the transmission terminal 900a need not to be the radio wave transmitted to the transmission apparatus recognition apparatus 10 (to the receiving unit 101). For example, the receiving unit 101 may receive radio waves transmitted by the transmission terminal 900 toward a wireless communication base station or an access point for a mobile phone or the like, or radio waves transmitted by the transmission terminal 900 to search for wireless communication base stations and access points. Alternatively, the receiving unit 101 may receive radio waves emitted by an interference signal transmission source (LED bulb inverter or fluorescent lamp) for important wireless communication.

In addition, it is assumed that the transmission apparatus recognition apparatus 10 is installed in an environment in which a plurality of radio signal transmission sources can transmit radio waves. The sources have different systems including communication systems whose frequencies, bandwidths, and the like are not standardized. In determination of the transmission source in such an installation environment, when there is a difference in parameters such as center frequency and bandwidth between the time of database registration and the time of determination (recognition), and/or when a plurality of transmission signals are included in the received signal, there is generated a difference in the extracted features. Then, in such a case, the recognition accuracy may decrease as a result of the generation of such a difference.

Then, the transmission apparatus recognition apparatus 10 according to this example embodiment determines that the detected signal region is not appropriate when the recognition evaluation by the degree-of-similarity calculation unit 131 and the evaluation unit 133 included in the recognition unit 130 is below a predetermined threshold value. As a result of such a determination, the transmission apparatus recognition apparatus 10 changes the signal conversion parameter in the conversion parameter determination unit 121 included in the feature extraction unit 120. Then, the transmission apparatus recognition apparatus 10 updates the signal conversion parameter until the recognition evaluation result exceeds a predetermined threshold value, and finally updates the cumulative probability threshold value in the threshold value update unit 124.

The description will return to the details of the individual units of FIG. 3. The signal region detection unit 110 can include a spectrogram generation unit 111, a threshold value determination unit (power threshold value determination unit) 112, and a detection unit (signal region determination unit) 113.

The spectrogram generation unit 111 generates a spectrogram from the received signal received by the receiving unit 101. Specifically, the spectrogram generation unit 111 repeats the process that executes processing of acquiring a specified number of samples from the acquired discrete waveform data, performing a Discrete Fourier Transform (DFT), and converting it into a power spectrum, while shifting the acquisition time. Here, DFT is an abbreviation for Discrete Fourier Transform. The spectrogram generation unit 111 generates a spectrogram representing received power values of the received signal on the two-dimensional plane of the time-frequency by such processing.

In addition, for the purpose of improving the detection characteristics, a filtering process by an image filter such as a median filter or a Gaussian filter, which are generally used in the field of image processing, may be applied to the generated spectrogram, to smooth the spectrogram. Note that a low-pass filter other than those illustrated can also be used for this filtering process.

As described above, the signal region detection unit 110 can also determine a signal received by the receiving unit 101 and subjected to the filtering process, to be the received signal, and generate a spectrogram from the received signal. As described above on the received signal conversion unit 104, the received signal conversion unit 122, which will be described later, converts the received signal according to the signal conversion parameter in the time slot in which there is the detection signal. However, a plurality of signals may actually be detected at the same time in the same time slot. Nevertheless, such a filtering process allows each of the detection signals to be extracted, and as a result, can reduce the decrease in the recognition accuracy of each.

The power threshold value determination unit 112 determines the power threshold value for binarizing which time-frequency domain the detection target signal exists in from the generated spectrogram. Specifically, the power threshold value determination unit 112 generates a Cumulative Distribution Function (CDF) of the power in each bin of time-frequency, and determines the power threshold for binarization from a predetermined cumulative probability threshold value. In this way, the power threshold value determination unit 112 can generate the power cumulative distribution function from the generated spectrogram, and from the generated power cumulative distribution function, it can determine the power threshold value (power threshold value for detecting a specific signal region) corresponding to a predetermined cumulative probability threshold value.

However, since the power threshold value cannot be uniquely determined due to the difference in the surrounding environment, the power threshold value for binarization is determined from the separately determined cumulative probability threshold value. As described above, the threshold value update unit 124 updates the cumulative probability threshold value, and the initial value thereof may be determined as in the following example.

Figure 5:
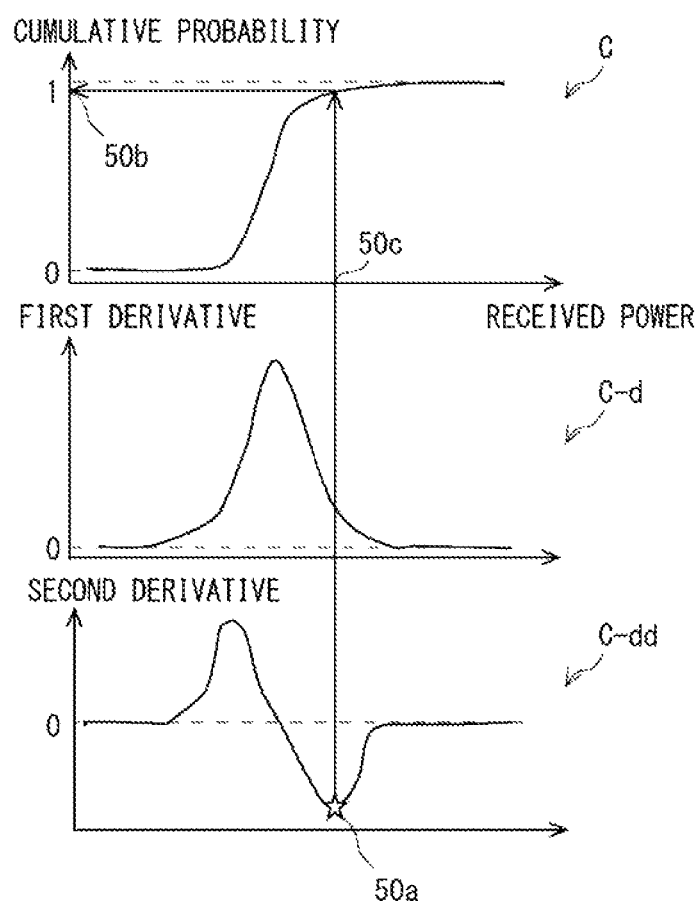
FIG. 5 is a diagram for explaining an example of a method for determining an initial value of a cumulative probability threshold value according to the second example embodiment.

Here, the cumulative probability threshold value is determined to be a point where the ratio of the background noise amount included in the detection region (specific signal region) is reduced to a very small amount and the power value of the target signal becomes dominant in the detection region. FIG. 5 shows a diagram for explaining an example of a method for determining the initial value of the cumulative probability threshold value. Graph C in FIG. 5 is an example of a curve of a power CDF created from power values within a predetermined time in a certain frequency bin of the spectrogram. Graph C-d of FIG. 5 is a curve obtained by the first derivative of the power CDF of Graph C in the power direction, and is equal to the histogram of the power of a certain frequency bin in the spectrogram. From the graph C-d, the proportion at which each received power is included can be seen. Graph C-dd of FIG. 5 is a curve obtained by the second derivative of the power CDF of Graph C in the power direction.

When the signals include only background noise, it is estimated that the graph C-d has a distribution close to a normal distribution. On the other hand, when the signal to be detected is also included, the shape of the right hem part of the distribution curb is broken (there is a change in the amount of change in the power distribution). Therefore, since the minimum value of the curve of the graph C-dd (the part indicated by reference numeral 50a) corresponds to an inflection point of the first derivative, it is possible to capture the power value in which the signal to be detected becomes dominant. This is because, when the background noise follows a normal distribution, the point of mean+standard deviation (1σ) is obtained by the second derivative and about 83% of the background noise is included to the left of this point, so that most of the background noise can be removed.

From the above, it can be said that the cumulative probability 50b corresponding to the reference numeral 50a can be used as the initial position of the cumulative probability threshold value in the graph C. Then, from the cumulative probability threshold determined in this way, the power threshold value determination unit 112 determines the value of the point 50c, which is drawn from the intersection of the power CDF curve of the graph C and the cumulative probability threshold value 50b, to be the power threshold value that is used for binarization. After that, the cumulative probability threshold is adjusted by the threshold value update process, which will be described later, to obtain a suitable cumulative probability threshold value. In the above description, the power CDF is generated for each frequency bin, and then the initial value of the cumulative probability threshold is determined for each. However, the power CDF may be totally generated using overall frequencies instead of being generated for each frequency bin, to determine the initial value of the total cumulative probability threshold value.

In this way, the power threshold value determination unit 112 can determine the cumulative probability, which corresponds to the power that has a minimum value in the second derivative of the power cumulative distribution function generated from the spectrogram, to be an initial value (initial cumulative probability threshold value) of the predetermined cumulative probability threshold value.

The signal region determination unit 113 generates a binarized spectrogram in which each unit region of the time-frequency of the generated spectrogram is set to 1 when the power thereof is greater than the power threshold value determined by the power threshold value determination unit 112, and it is set to 0 when the power thereof is equal to or smaller than the power threshold value. Note that, in the binarized spectrogram, there is no problem if 0 and 1 are inverted. Then, the signal region determination unit 113 performs a rectangle circumscribing process generally used in the field of image processing on the generated binarized spectrogram, and determines the signal region parameter from the circumscribed rectangle. Signal region parameters include center frequency, bandwidth, and transmission start/end times. Note that, when a plurality of detection target signals are included in the received signal, a plurality of circumscribed rectangles are generated, and therefore the signal region parameters are determined for each of them. In this way, the signal region determination unit 113 detects the signal region parameter from the spectrogram using the power threshold value.

The feature extraction unit 120 can include a conversion parameter determination unit 121, a received signal conversion unit 122, a feature generation unit 123, and a threshold value update unit 124. The conversion parameter determination unit 121 determines signal conversion parameters (conversion frequency and sampling rate) so that the detection signal (detection target signal) detected based on the signal region parameters are converted to have a center frequency of 0 Hz and a predetermined bandwidth. The received signal conversion unit 122 generates a signal obtained by converting the signal in the same time slot as the detection signal, among the received signal received by the receiving unit 101, according to the signal conversion parameter.

The feature generation unit 123 generates a radio wave feature from the received signal converted by the received signal conversion unit 122. The radio wave feature used by the transmission apparatus recognition apparatus 10 for recognition of the transmission terminal of the radio wave transmission source can be various features in which individual differences of the transmission terminal 900 appear.

Examples of the radio wave feature include power spectral densities and spectrograms of transients (rising and falling edges) and a reference signal part such as a preamble, of the received signal in the receiving unit 101. The radio wave features include the processing results of the continuous wavelet transform (CWT) and the Hilbert transform. Furthermore, the radio wave features include the error vector magnitude (EVM) of the received signal. In addition, examples of the radio wave feature include the amplitude and phase error of the IQ (in-phase/quadrature phase) signal, the IQ imbalance amount. Alternatively, the radio wave features to be used may include a feature indicating one or more of the frequency offsets and the symbol clock error. However, the examples of the radio wave feature here are not intended to limit the features used by the transmission apparatus recognition apparatus 10 to determine the transmission terminal.

The recognition unit 130 can include a degree-of-similarity calculation unit 131, a storage unit 132, an evaluation unit 133, and an output unit 134. The storage unit 132 memorizes (stores) the template feature as a feature stored in advance in, for example, a database format. The degree-of-similarity calculation unit 131 calculates the degree of similarity of 1 to N between the sample feature generated by the feature generation unit 123 and the template feature registered in the storage unit 132 (what is called database) to determine the degree of similarity. Note that N is a value indicating the number of registered template features, and is a positive integer. In addition, here, the feature generated from the IQ signal converted by the feature generation unit 123 is referred to as a sample feature, and the feature registered in the storage unit 132 is referred to as a template feature.

Examples of what is used for calculating the degree of similarity between the sample feature and the template feature may include cosine similarity, Euclidean score, correlation coefficient. That is, the degree of similarity calculated by the degree-of-similarity calculation unit 131 can be any one of the cosine similarity, the Euclidean score, and the correlation coefficient, or it can be a combination of a plurality of them. Note that the degree of similarity can be calculated as a degree-of-similarity score.

Specifically, when the two N-dimensional feature vectors are $<p>=(p\_1,\ldots,p\_N)$ and $<q>=(q\_1,\ldots,q\_N)$, the cosine similarity is expressed by expression (1), the Euclidean score is expressed by expression (2), and the correlation coefficient is expressed by expression (3). Note that, here, $<p>$ is a notation of a vector of p, and $<q>$ is a notation of a vector of q for convenience. In addition, the notations of the superscript bars of p and q in the expression (3) are expressed by expressions (4) and (5), respectively.

[Expression 1]

$$S_{cos} = \frac{\sum_{i=1}^{N} p_i q_i}{\sqrt{\sum_{i=1}^{N} p_i^2} \sqrt{\sum_{i=1}^{N} q_i^2}} \quad (1)$$

$$S_{euclid} = \frac{1}{1 + \sqrt{\sum_{i=1}^{N} (p_i - q_i)^2}} \quad (2)$$

$$S_{corr} = \frac{\sum_{i=1}^{N} (p_i - \bar{p})(q_i - \bar{q})}{\sqrt{\sum_{i=1}^{N} (p_i - \bar{p})^2} \sqrt{\sum_{i=1}^{N} (q_i - \bar{q})^2}} \quad (3)$$

$$\bar{p} = \sum_{i=1}^{N} p_i \quad (4)$$

$$\bar{q} = \sum_{i=1}^{N} q_i \quad (5)$$

The degree of similarity calculation method described here is merely an example, and is not intended to limit the method used by the transmission apparatus recognition apparatus 10 to calculate the degree of similarity. Note that the explanation below is on the assumption in which: the more similar the features are, the higher (closer to 1) degree of similarity is output; and the more different the features are, the lower (closer to 0) degree of similarity is output, but the present disclosure is not limited to this.

The evaluation unit 133 calculates the false acceptance rate and the false rejection rate based on the degree of similarity calculation result between the sample feature generated from the labeled data set (received signal received under the condition that there is only a specific transmission terminal) and the template feature registered in the storage unit 132. The false acceptance rate and false rejection rate each become a curve when the threshold of degree of similarity is changed. For example, when the value obtained by subtracting the intersection of the false acceptance rate curve and the false rejection rate curve (equivalent error rate) from 1 is used as the recognition accuracy, the evaluation unit 133 compares this recognition accuracy with a predetermined threshold value. Then, when the recognition accuracy is lower than the predetermined threshold value, the setting of the signal conversion parameter is determined to be inappropriate, so that the evaluation unit 133 notifies the conversion parameter determination unit 121 of the change of the signal conversion parameter. This notification may correspond to a change instruction.

The conversion parameter determination unit 121 receives a notification from the evaluation unit 133 of the change in the signal conversion parameter, and revises the signal conversion parameter. In this way, the loops of change of the signal conversion parameters, recognition, and evaluation of the signal conversion parameters are repeated, and finally the cumulative probability threshold is updated as follows.

That is, the threshold value update unit 124 updates the cumulative probability threshold value based on the signal conversion parameter when the predetermined recognition accuracy is reached. For example, when the width of a specific signal region (signal detection width) is wide, it can be said that the specific signal region includes extra background noise, so that the cumulative probability threshold is updated to higher side. This changes the power threshold to higher side, and narrows the width of the specific signal region detected by the signal region determination unit 113. On the other hand, when the signal detection width is narrow, it can be said that the region that should be normally detected as a specific signal region has not been detected, so that the cumulative probability threshold is updated to lower side. This changes the power threshold value to lower side, and widen the width of the specific signal region detected by the signal region determination unit 113.

When there is a terminal having a template feature whose degree of similarity output by the degree-of-similarity calculation unit 131 is greater than a predetermined recognition threshold value, the output unit 134 outputs the recognition result (identification information of the registered transmission terminal such as the ID of the transmission terminal that is the transmission source of the radio wave). When there are a plurality of terminals each having template feature whose degree of similarity is greater than a predetermined recognition threshold value, the output unit 134 may output the greatest one as a recognition result, or may output a predetermined number of the terminals as the candidates, where the predetermined number is 2 or more. Alternatively, when there is no terminal having a template feature whose degree of similarity is greater than a predetermined recognition threshold value, the output unit 134 may output that the terminal is an unknown terminal (unregistered transmission source).

Note that the evaluation unit 133 and the output unit 134 can operate exclusively. Specifically, the evaluation unit 133 can operate during learning of the cumulative probability threshold value (in other words, in time of learning the power threshold value), and the output unit 134 can operates after learning. The learning can refer to, for example, the processing from the start to the end of the update by the threshold value update unit 124, and the model operation can start after the learning.

As described above, in the transmission apparatus recognition apparatus 10 having a configuration in which the signal region detection unit 110 includes units 111 to 113 and the feature extraction unit 120 includes units 103 to 105, and 108, the cumulative probability threshold is updated from a predetermined value based on the recognition accuracy. Then, such an update adjusts the signal region parameter based on the recognition accuracy.

Hereinafter, an operation example of the transmission apparatus recognition apparatus 10 as described above will be described in detail with reference to the flows of FIGS. 6 to 9 and 10.

Figure 6:
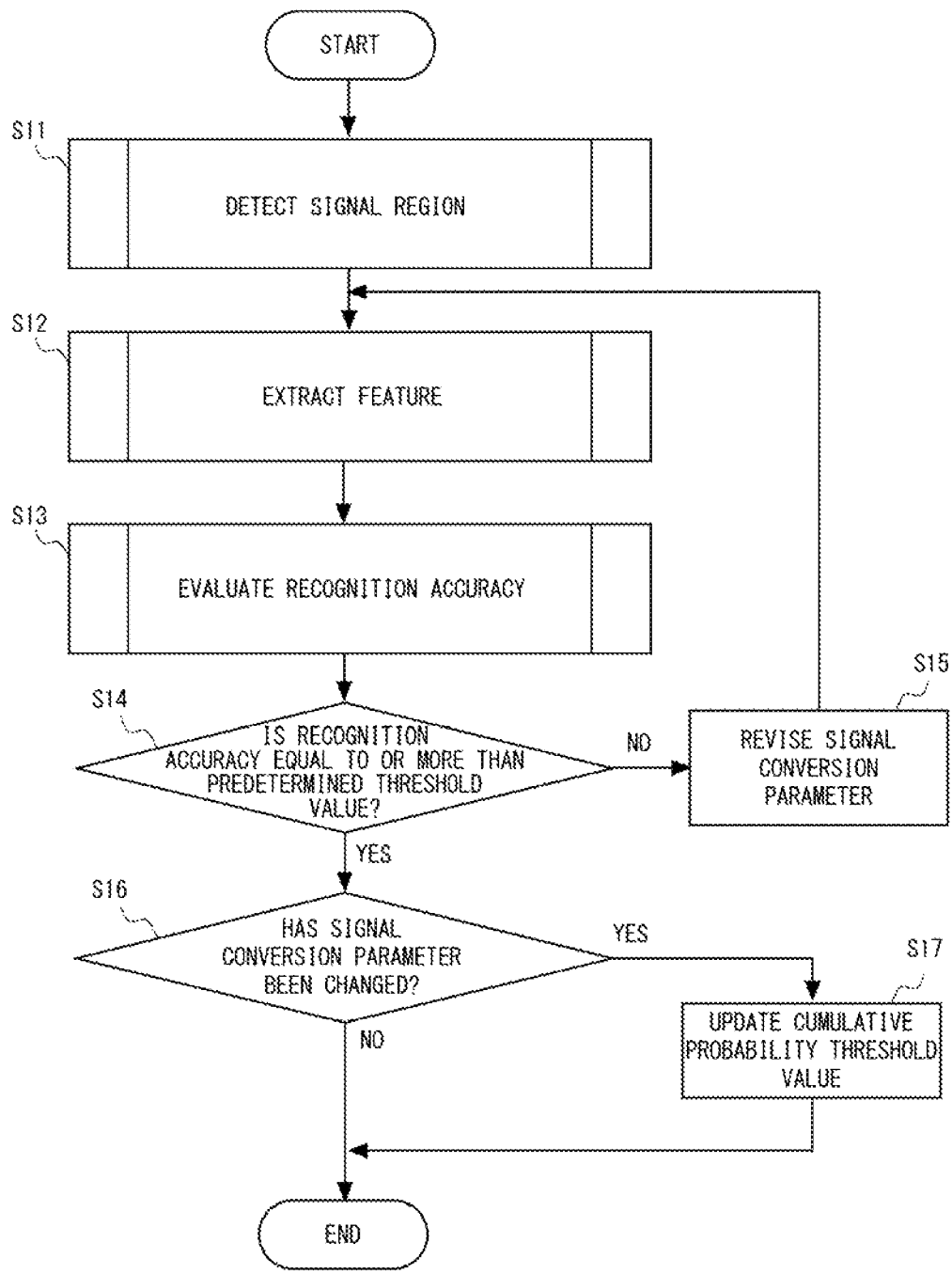
FIG. 6 is a diagram showing an overall flow (in time of learning a threshold value) of an operation example of the transmission apparatus recognition apparatus according to the second example embodiment.

FIG. 6 is a diagram showing an overall flow (in time of learning the cumulative probability threshold value) of an operation example of the transmission apparatus recognition apparatus 10 according to the second example embodiment. The transmission apparatus recognition apparatus 10 detects a specific signal region from the received signal (step S11), and extracts a sample feature from the detected signal (step S12). Then, the transmission apparatus recognition apparatus 10 evaluates (calculates) the recognition accuracy (step S13), and determines whether the recognition accuracy is equal to or greater than a predetermined threshold value (step S14).

If the determination is NO in step S14, the transmission apparatus recognition apparatus 10 revises the signal conversion parameter (step S15) and returns to step S12. If the determination is YES in step S14, the transmission apparatus recognition apparatus 10 determines whether the signal conversion parameter has been changed (revised) in step S15 (step S16). If the signal conversion parameter has been changed (if the determination is YES in step S16), the transmission apparatus recognition apparatus 10 updates the cumulative probability threshold (step S17). If the determination is NO in step S16, or after the processing in step S17, the operation ends.

Figure 7:
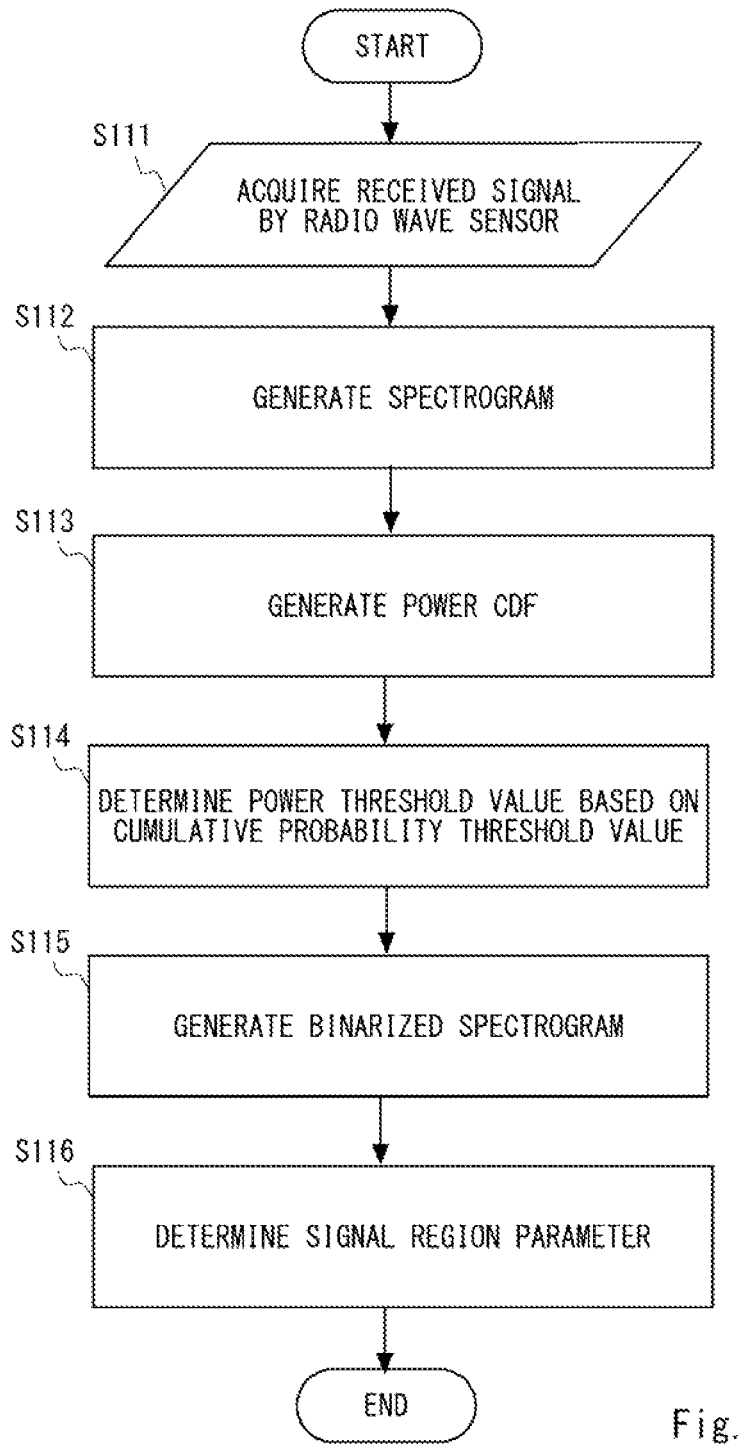
FIG. 7 is a diagram showing a processing flow relating to detection of a signal region according to the second example embodiment.

FIG. 7 is a diagram showing an operation example of detection of a signal region (step S11 in FIG. 6) according to the second example embodiment. The transmission apparatus recognition apparatus 10 operates the receiving unit 101 having a radio wave sensor to receive the signal transmitted by the transmission terminal (step S111). Next, the spectrogram generation unit 111 generates a spectrogram from the received signal acquired in step S111 (step S112).

Next, the power threshold value determination unit 112 generates a power CDF for each bin of time-frequency (step S113). Then, the power threshold value determination unit 112 determines a power threshold value for binarizing which time-frequency domain the detection target signal exists in based on a predetermined cumulative probability threshold value (step S114). Next, the signal region determination unit 113 generates a binarized spectrogram in which each unit region of the time-frequency of the spectrogram is set to 1 when the power thereof is greater than the power threshold value and it is set to 0 when the power thereof is equal to or smaller than the power threshold value (step S115). Then, the signal region determination unit 113 performs the rectangle circumscribing process on the binarized spectrogram, and determines the signal region parameter from the circumscribed rectangle (step S116).

The specific signal region indicated by the signal region parameter in this example is a signal region obtained (determined) by detecting rectangles in a binarized spectrogram obtained by binarizing with some threshold value from a spectrogram image expressed in grayscale or the like. For example, even if the spectrogram itself generated from the received signal has a width of 10 MHz, a specific signal region may have a width of, for example, 100 kHz.

Figure 8:
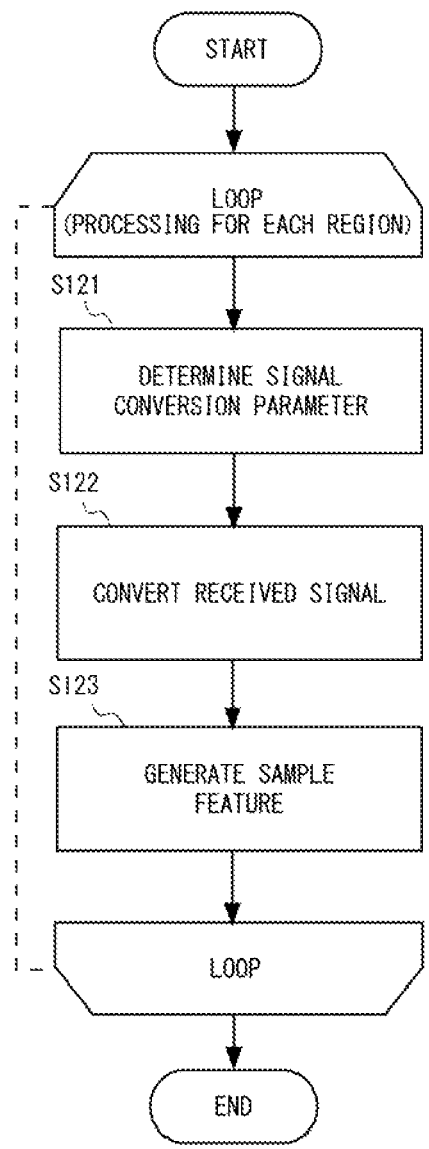
FIG. 8 is a diagram showing a processing flow relating to extraction of a feature according to the second example embodiment.

FIG. 8 is a diagram showing an operation example of extraction of features (step S12 in FIG. 6) according to the second example embodiment. The conversion parameter determination unit 121 determines the signal conversion parameter based on the signal region parameter determined by the signal region determination unit 113 in step S11 so that the detection target signal is converted to have a center frequency of 0 Hz and a predetermined bandwidth (step S121). Here, the description is made on the assumption that there are a plurality of signal conversion parameters for each specific signal region to form a signal conversion parameter set.

Next, the received signal conversion unit 122 generates a converted signal by converting a signal in the same time slot as the detection signal among the received signals received by the receiving unit 101 according to the conversion parameter set (step S122). Next, the feature generation unit 123 generates a radio wave feature (sample feature) from the signal converted in step S122 (step S123). Note that, when there are a plurality of signal region parameter sets determined in step S11, the processing of steps S121 to S123 is performed for the number of the regions. Therefore, one sample feature is generated for each region.

Figure 9:
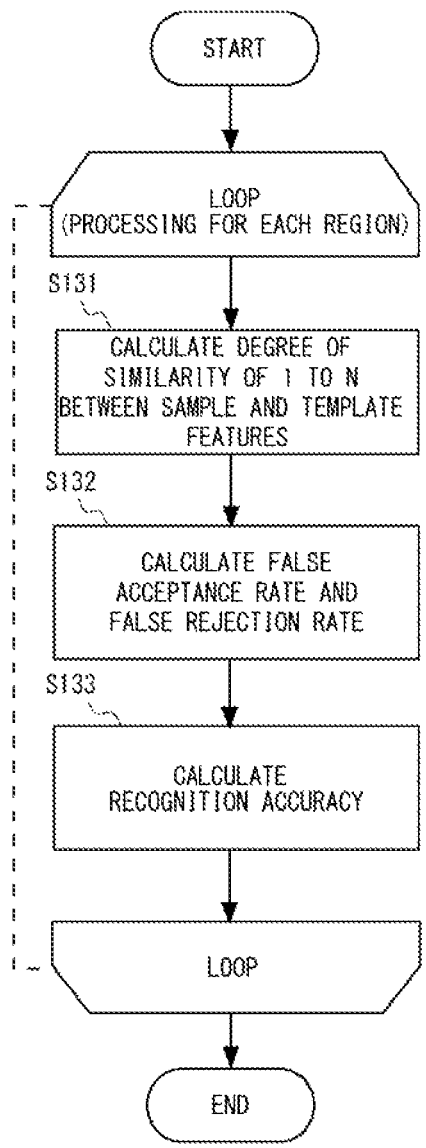
FIG. 9 is a diagram showing a processing flow relating to evaluation of recognition accuracy according to the second example embodiment.

FIG. 9 is a diagram showing an operation example of evaluation of recognition accuracy (step S13 in FIG. 6) according to the second example embodiment. The degree-of-similarity calculation unit 131 calculates the degree of similarity of 1 to N (N is a natural number) with the template feature registered in the storage unit 132, and determines the degree of similarity (step S131). Next, the evaluation unit 133 calculates the false acceptance rate and the false rejection rate based on the degree of similarity calculation result (step S132). Then, the degree-of-similarity calculation unit 131 calculates the recognition accuracy based on the false acceptance rate and the false rejection rate calculated in step S132 (step S133). Note that, when there are a plurality of signal region parameter sets determined in step S11, the processing of steps S131 to S133 is also performed for the number of the regions. Therefore, one recognition accuracy is calculated for each region.

The description will return to the explanation of the flow of FIG. 6. When the recognition accuracy calculated in step S133 is equal to or less than a predetermined threshold value, the evaluation unit 133 notifies the conversion parameter determination unit 121 of the change of the signal conversion parameter. The conversion parameter determination unit 121 receives the notification from the evaluation unit 133 and revises the signal conversion parameter (step S15). The loop of steps S12 to S15 is repeated until the recognition accuracy becomes equal to or higher than a predetermined threshold value in step S14. That is, when the recognition accuracy is equal to or higher than the predetermined threshold value, or when the loop processing is repeated one or more times and the recognition accuracy exceeds the predetermined threshold value, the process advances to the next step (step S16). When the signal conversion parameter has been changed, that is, when the loop processing has been performed even once, the threshold value update unit 124 updates the cumulative probability threshold value (step S17).

As described with reference to FIG. 6, the transmission apparatus recognition apparatus 10 repeats the process of adjusting the signal region parameter when the recognition accuracy of the sample feature extracted from the signal is lower than the predetermined threshold value. More specifically, the adjustment of the signal region parameter can be performed by repeating the following process (a). In the process (a), the signal conversion parameter is changed based on the recognition accuracy, the feature extraction unit 120 extracts a sample feature from the signal after converting the received signal based on the changed signal conversion parameter, and the recognition unit 130 executes recognition of the transmission terminal and compares the recognition accuracy with a predetermined threshold value. The adjustment of the signal region parameter is performed by repeating the above process (a).

As described above, in the above process (a), the signal conversion parameter is changed instead of directly changing the signal region parameter, and repeating the process (a) adjusts the signal region parameter.

Then, as described above, the adjustment of the signal region parameter preferably ends the repetition when the change width of the recognition accuracy becomes equal to or less than a predetermined value. In addition, as an alternative process of such an end process, or in addition to such an end process, the adjustment of the signal region parameter can end the repetition when the recognition accuracy becomes greater than a predetermined threshold value. That is, it is also possible to repeat the adjustment of the signal region parameter until the recognition accuracy becomes greater than the predetermined threshold value.

Figure 10:
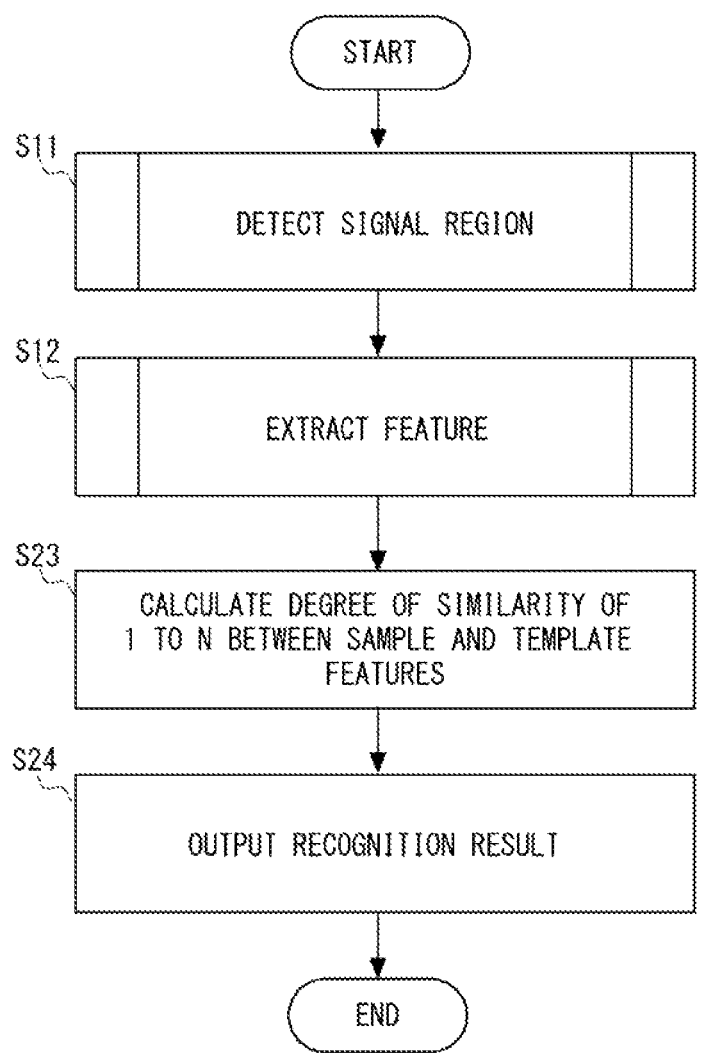
FIG. 10 is a diagram showing an overall flow (after learning the threshold value) of an operation example of the transmission apparatus recognition apparatus according to the second example embodiment.

FIG. 10 is a diagram showing an overall flow (after learning the cumulative probability threshold value) of an operation example of the transmission apparatus recognition apparatus 10 according to the second example embodiment. In this operation flow, the signal region detection unit 110 detects a signal region from the received signal (step S11), and then the feature extraction unit 120 extracts a sample feature from the detected signal (step S12). In this operation flow, the degree-of-similarity calculation unit 131 then calculates the degree of similarity of 1 to N between the sample feature extracted in step S12 and the template feature stored in the storage unit 132 (step S23). After that, the output unit 134 determines whether there is a transmission terminal whose degree-of-similarity score corresponding to the above N template features is equal to or higher than a predetermined recognition threshold value, and outputs the determination result (step S24).

Note that the differences between the flow after learning in FIG. 10 and the flow in time of learning in FIG. 6 are as follows. In FIG. 10, there is no part for revising the signal conversion parameter by iterative processing (steps S14, S15, etc.) and no update of the cumulative probability threshold value (steps S16, S17). In FIG. 10, the recognition result is output. That is, these points are the differences in the flow.

In addition, if the recognition accuracy is lower than the predetermined threshold value, the transmission apparatus recognition apparatus 10 is required to adjust the signal region parameters output from the signal region detection unit 110 so as to increase the recognition accuracy, to finally adjust the recognition accuracy to be higher than the predetermined threshold value. In particular, it is preferable to adjust the recognition accuracy so as to increase it every adjustment as much as possible. In order to increase the recognition accuracy, for example, if adjustment is made in the direction of reducing the bandwidth and results in increase of the recognition accuracy, it is preferable to make adjustment in the direction of reducing the bandwidth in the same tendency. On the other hand, for example, if the adjustment is made in the direction of reducing the bandwidth and results in decrease of the recognition accuracy, it is possible to perform processing such as shifting the center frequency while searching for a direction in which the recognition accuracy increases.

With the above configuration, when the transmission apparatus recognition apparatus 10 according to this example embodiment receives a signal of a non-standardized communication system and recognizes the transmission terminal, it automatically adjusts the signal region parameters, and can gain the following effects. That is, the transmission apparatus recognition apparatus 10 according to this example embodiment can reduce decrease in identification accuracy (recognition accuracy) even in situations where the center frequency or bandwidth of the signal received over a wide band is different from when it was registered in the database. Note that the same or similar applies to the case of receiving a signal of an apparatus that unintentionally transmits radio waves and recognizing the apparatus.

In particular, if the signal bandwidth of the feature registered in the database and the bandwidth of the signal to be recognized are different, the recognition accuracy significantly decreases. However, in this example embodiment, the signal is converted in the following way using the signal region parameters determined from the spectrogram. That is, in this example embodiment, the frequency shift and the sampling frequency are converted using the signal region parameter so that the bandwidth containing the signal and the sampled bandwidth have the same ratio (for example, 1:4) at the time when the feature registered in the database is generated and in the signal to be recognized. As a result, in this example embodiment, it is possible to reduce decrease in recognition accuracy. In addition, at this time, since deviation from the center of the band also causes decrease in the recognition accuracy, converting the center frequency so that the center becomes 0 can further reduce the decrease in the recognition accuracy.

<Other Example Embodiment>

In the plurality of flowcharts referred to in the description of the second example embodiment, a plurality of steps (processes) are described in order, but the execution order of the steps executed in each example embodiment is not limited to the order of description. In each example embodiment, the order of the illustrated steps can be changed within a range that does not hinder anything in the processes, for example, each process can be executed in parallel. In addition, the above-described example embodiments can be combined as long as there is no conflict with each other.

Then, as in the description in the first and second example embodiments on the procedure of processing in the transmission apparatus recognition apparatus, the present disclosure may also take a form as a transmission apparatus recognition method in a transmission apparatus recognition apparatus including a receiving unit that receives a signal wirelessly transmitted from a transmission terminal. The transmission apparatus recognition method can include a signal region detection step, a feature extraction step, a recognition step, and an adjustment step. The signal region detection step generates a spectrogram from the received signal received by the receiving unit, and detects a signal region parameter indicating a specific signal region based on the generated spectrogram. The feature extraction step converts the received signal based on the signal conversion parameter corresponding to the signal region parameter, and extracts the feature from the converted signal. The recognition step calculates the degree of similarity based on the feature extracted by the feature extraction step and the feature stored in advance, and recognizes the transmission terminal based on the calculated degree of similarity. The adjustment step adjusts the signal region parameters detected in the signal region detection step based on the recognition accuracy, which is the recognition accuracy in the recognition step. Note that other examples are as described in the various example embodiments described above.

In addition, regarding the transmission apparatus recognition apparatus and its system according to the first and second example embodiments, the individual units that are the components thereof have been functionally described, but the present disclosure is not limited to this. For example, the recognition unit may include a radio wave feature generation unit, as long as the transmission apparatus recognition apparatus includes the function of each unit. In addition, in each of the above-described example embodiments, the description has been made on the assumption that the transmission apparatus recognition apparatus is configured as a single apparatus, but it can be configured as a plurality of apparatuses by dividing the functions.

Figure 11:
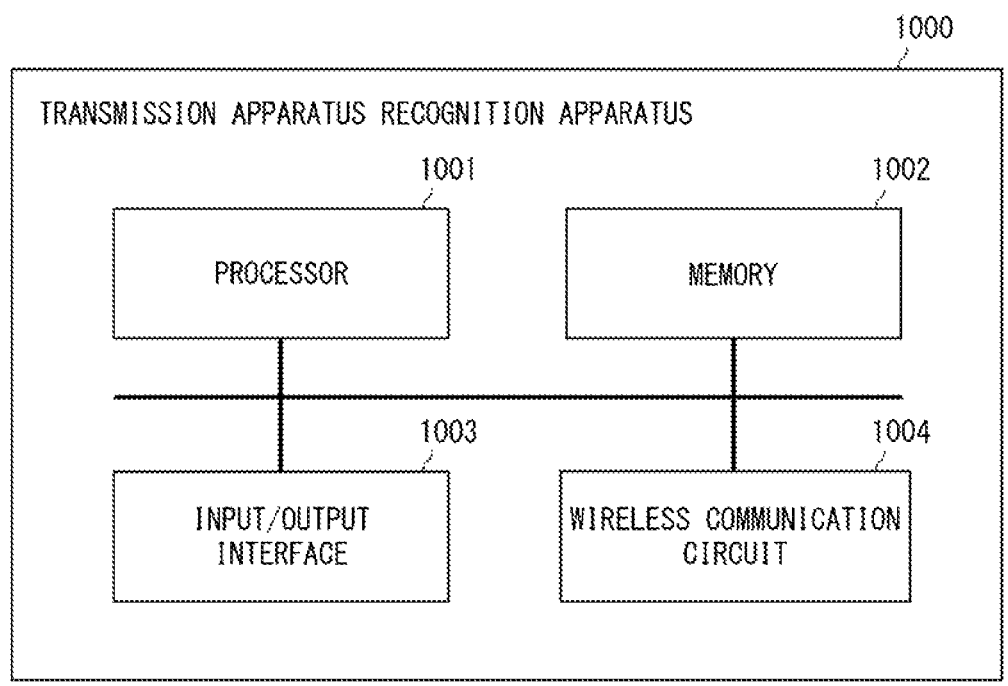
FIG. 11 is a diagram showing an example of a hardware configuration included in a transmission apparatus recognition apparatus.

In addition, the transmission apparatus recognition apparatus according to the first and second example embodiments can each have the following hardware configuration. FIG. 11 is a diagram showing an example of a hardware configuration included in the apparatus.

The transmission apparatus recognition apparatus 1000 illustrated in FIG. 11 can be the transmission apparatus recognition apparatus according to the first or second example embodiment. The transmission apparatus recognition apparatus 1000 can be configured by an information processing apparatus (what is called computer), and includes, for example, a processor 1001, a memory 1002, an input/output interface 1003, a wireless communication circuit 1004. Note that transmission apparatus recognition apparatus 1000 may include a wired communication circuit in addition to the wireless communication circuit 1004. The components such as the processor 1001 are connected by an internal bus or the like so that they can communicate with each other.

The processor 1001 is a programmable apparatus such as a CPU (Central Processing Unit), an MPU (Micro Processing Unit), a DSP (Digital Signal Processor), or a GPU. Alternatively, the processor 1001 may be an apparatus such as an FPGA (Field Programmable Gate Array) or an ASIC (Application Specific Integrated Circuit). The processor 1001 can execute various programs including an operating system (OS).

The memory 1002 is a storage apparatus such as a RAM (Random Access Memory), a ROM (Read Only Memory), an HDD (Hard Disk Drive), an SSD (Solid State Drive), or a memory card. The memory 1002 stores an OS program, an application program, and various data.

The input/output interface 1003 is an interface of a display apparatus or an input apparatus (not shown). The display apparatus is, for example, a liquid crystal display. The input apparatus is, for example, an apparatus that accepts user operations such as a keyboard and a mouse.

The wireless communication circuit 1004 is a circuit, a module, or the like that performs wireless communication with other apparatuses. For example, the wireless communication circuit 1004 includes an RF (Radio Frequency) circuit. Note that a part or all of the transmission apparatus recognition apparatus 1000 can also be realized by one or a plurality of integrated circuits.

The function of the transmission apparatus recognition apparatus 1000 can be realized by various processing modules. The processing module is realized, for example, by the processor 1001 executing a program stored in the memory 1002. The program (transmission apparatus recognition program) in this case can be a program for causing the computer of the transmission apparatus recognition apparatus 1000 to execute the above-mentioned four steps. The transmission apparatus recognition apparatus 1000 includes a receiving unit (illustrated in the wireless communication circuit 1004) that receives a signal wirelessly transmitted from a transmission terminal. The four steps described above are the signal region detection step, the feature extraction step, the recognition step, and the adjustment step. Note that other examples are as described in the various example embodiments described above. Furthermore, the processing module may be realized by a semiconductor chip.

In addition, the transmission apparatus recognition program described above can be contained in a computer readable storage medium. This storage medium can be non-transitory, that is, a non-transitory computer readable medium. As described above, the object of the present disclosure can also be realized by embodying it as a computer program product. For example, the program can be downloaded via the network or updated using a storage medium that stores the program. Furthermore, the processing module described above may be realized by a semiconductor chip.

In this way, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above example embodiment, and can be appropriately modified without departing from the spirit. In addition, the present disclosure may be carried out by appropriately combining the respective example embodiments. The first and second example embodiments can be combined as desirable by one of ordinary skill in the art.

According to the present disclosure, there can be provided a transmission apparatus recognition apparatus, a transmission apparatus recognition method, and a program, capable of reducing decrease in recognition accuracy even for a wide band signal compared to the signal wirelessly transmitted from a transmission apparatus to be recognized. Note that, according to the present disclosure, other effects may be exhibited in place of or in combination with such effects.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A transmission apparatus recognition apparatus comprising:
    a receiver configured to receive a signal wirelessly transmitted from a transmission apparatus;
    a signal region detector configured to generate a spectrogram from a received signal received by the receiver and to detect a signal region parameter indicating a specific signal region based on the spectrogram;
    a feature extractor configured to convert the received signal based on a signal conversion parameter corresponding to the signal region parameter and to extract a feature from a converted signal; and
    a recognizer configured to calculate a degree of similarity based on a feature extracted by the feature extractor and a feature stored in advance and to recognize the transmission apparatus based on the degree of similarity,
    wherein the signal region parameter detected by the signal region detector is adjusted based on a recognition accuracy that is a recognition accuracy of the recognizer.

2. The transmission apparatus recognition apparatus according to claim 1, wherein the transmission apparatus recognition apparatus adjusts the signal region parameter output from the signal region detector so as to increase the recognition accuracy when the recognition accuracy is lower than a predetermined threshold value.

3. The transmission apparatus recognition apparatus according to claim 2,
    wherein the signal region parameter is adjusted such that:
    a process is repeated; and when the recognition accuracy becomes greater than the predetermined threshold value, the repeating is terminated, the process being a process in which:
    the signal conversion parameter is changed based on the recognition accuracy;
    the feature extractor extracts a feature from a signal after converting the received signal, based on the changed signal conversion parameter; and
    the recognizer recognizes the transmission apparatus and compares the recognition accuracy with the predetermined threshold value.

4. The transmission apparatus recognition apparatus according to claim 2,
    wherein the signal region parameter is adjusted such that:
    a process is repeated; and when a change width of the recognition accuracy becomes equal to or less than a predetermined value, the repeating is terminated, the process being a process in which:
    the signal conversion parameter is changed based on the recognition accuracy;
    the feature extractor extracts a feature from a signal after converting the received signal, based on the changed signal conversion parameter; and
    the recognizer recognizes the transmission apparatus and compares the recognition accuracy with the predetermined threshold value.

5. The transmission apparatus recognition apparatus according to claim 1,
    wherein the signal region detector includes:
    a spectrogram generation unit configured to generate the spectrogram from the received signal;
    a threshold value determination unit configured to generate a power cumulative distribution function from the spectrogram and to determine a power threshold value from the generated power cumulative distribution function, the power threshold value corresponding to a predetermined cumulative probability threshold value; and
    a detection unit configured to detect the signal region parameter from the spectrogram using the power threshold value, and
    wherein the feature extractor includes:
    a conversion parameter determination unit configured to determine the signal conversion parameter so that a signal after converting a detection signal has a center frequency of 0 and a predetermined bandwidth, the detection signal being a signal of the specific signal region indicated by the signal region parameter among the received signals;
    a received signal conversion unit configured to convert the received signal according to the signal conversion parameter in a time slot in which there is the detection signal;
    a feature generation unit configured to generate a feature from a signal converted by the received signal conversion unit; and
    a threshold value update unit configured to update the predetermined cumulative probability threshold value based on the recognition accuracy.

6. The transmission apparatus recognition apparatus according to claim 5,
    wherein the threshold value determination unit determines a cumulative probability to be an initial value of the predetermined cumulative probability threshold value, the cumulative probability corresponding to a power having a minimum value in the second derivative of the power cumulative distribution function generated from the spectrogram.

7. The transmission apparatus recognition apparatus according to claim 1,
    wherein the signal region detector determines a signal received by the receiver and subjected to a filtering process, to be the received signal, and generates the spectrogram from the received signal.

8. A transmission apparatus recognition method in a transmission apparatus recognition apparatus including a receiver configured to receive a signal wirelessly transmitted from a transmission apparatus, the method comprising:
    a signal region detection step of generating a spectrogram from a received signal received by the receiver and detecting a signal region parameter indicating a specific signal region based on the spectrogram;
    a feature extraction step of converting the received signal based on a signal conversion parameter corresponding to the signal region parameter and extracting a feature from a converted signal;
    a recognition step of calculating a degree of similarity based on a feature extracted in the feature extraction step and a feature stored in advance and recognizing the transmission apparatus based on the degree of similarity; and
    an adjustment step of adjusting the signal region parameter detected in the signal region detection step based on a recognition accuracy that is a recognition accuracy in the recognition step.

9. A non-transitory computer readable medium including a program recorded therein, the program being configured to cause a computer, which is mounted on a transmission apparatus recognition apparatus including a receiver configured to receive a signal wirelessly transmitted from a transmission apparatus, to execute:
- a signal region detection step of generating a spectrogram from a received signal received by the receiver and detecting a signal region parameter indicating a specific signal region based on the spectrogram;
- a feature extraction step of converting the received signal based on a signal conversion parameter corresponding to the signal region parameter and extracting a feature from a converted signal;
- a recognition step of calculating a degree of similarity based on a feature extracted in the feature extraction step and a feature stored in advance and recognizing the transmission apparatus based on the degree of similarity; and
- an adjustment step of adjusting the signal region parameter detected in the signal region detection step based on a recognition accuracy that is a recognition accuracy in the recognition step.

* * * * *